Feb. 27, 1968 C. H. ROSENBAUER 3,370,948

METHOD FOR SELECTIVE ETCHING OF ALKALI GLASS

Filed April 13, 1966

CHARLES H. ROSENBAUER
INVENTOR

BY Lowell J. Wise
ATTORNEY 3,370,948
Patented Feb. 27, 1968

3,370,948

METHOD FOR SELECTIVE ETCHING OF ALKALI GLASS

Charles H. Rosenbauer, Irondequoit, N.Y., assignor to Bausch & Lomb Incorporated, Rochester, N.Y., a corporation of New York Continuation-in-part of abandoned application Ser. No. 310,935, Sept. 23, 1963. This application Apr. 13, 1966, Ser. No. 542,372
13 Claims. (Cl. 96—36.2)

This application is a continuation-in-part of U.S. patent application Ser. No. 310,935 filed Sept. 23, 1963, now abandoned.

The present invention relates to a method for selectively etching alkali glass surfaces to produce a pattern on a substrate. In particular the novel method includes the selective application of silver-containing material, as by photographic processes, to a glass substrate with subsequent migration of the silver into the glass surface. By contacting the treated surface with hydrofluoric acid, those portions of the surface containing no silver are selectively etched. In one embodiment of the invention the etched substrate may be further coated with an electrically-conducting material and raised portions abraded to produce a conducting pattern suitable for use as a printed circuit element.

Etched glass surfaces having a high degree of resolution between raised and depressed surface areas are useful for a wide variety of articles. Various stained reticles, clear diffraction gratings, and electrically-conductive circuits may be made using the selective etching methods of this invention. Also, the method may be used for ornamental designs and highly-accurate scales or calibrating devices.

It has been discovered that an alkali glass may be treated by diffusing silver ions from a source in contact with the glass surface into the glass matrix of the substrate material, and that this treatment makes the glass containing silver resistant to hydrofluoric acid or other source of fluoride ions. The silver may remain in the ionic state as diffused or may be reduced to produce a stain at the surface. In either oxidized or reduced form the silver imparts etch resistance to the glass, and untreated portions of the surface are etched preferentially by fluoride ions to produce surface dimensional variations which are useful for many precision products.

Accordingly it is an object of this invention to provide a method for selectively etching a glass surface comprising the steps of applying silver-containing material to selected portions of the surface, migrating silver into the glass matrix, and contacting the surface with fluoride ions to remove untreated portions of the glass while leaving the silver-containing matrix substantially unchanged thereby producing a three-dimensional pattern in the glass surface suitable for many practical uses. Further objects are to provide photographic methods for masking and exposing a coated glass substrate and developing the latent image to remove silver from areas to be etched while leaving silver in areas to be etch-resistant, subsequently migrating silver into the glass substrate, and etching the glass surface to remove untreated areas containing no silver. These and other objects and features of the drawing will become apparent in the following description and in the drawing wherein:

FIGS. 1 to 5 are vertical cross-sectional views of a glass substrate at various stages of the novel process, in which:

FIG. 1 shows a developed latent image produced by photography,

FIG. 2 shows silver diffused into the glass substrate,

FIG. 3 shows the profile of an etched surface,

FIG. 4 shows an etched surface coated with a thin metal film, and

FIG. 5 shows the exposed substrate after removal of raised film portions.

Figure 1:
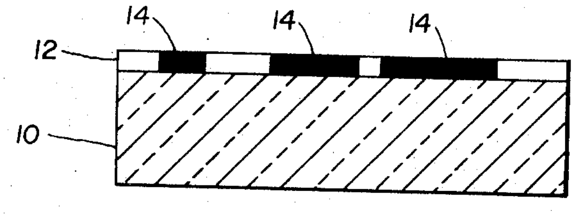

The basic concepts of the invention may be used with several process variations to produce the necessary silver in a glass matrix for selective etching with fluoride ions. The photographic methods for producing an image with silver material has received the greatest attention in conjunction with the novel process because of the relative ease in duplicating complex surface designs and transferring them to the desired glass substrate. Other alternative methods for imparting a pattern of silver-containing material on a substrate include printing with a silver ink in a suitable vehicle, spraying of solid or fluid particles through a mask, vapor deposition, or decomposition of a silver material on the substrate. Also, the silver may be coated uniformly on the surface and removed in the desired areas by etching, ruling, abrading, mechanical cutting, etc. The degree of fineness which may be achieved in the etching step appears to be controlled by the fineness or resolution of the methods for depositing silver metal or ions on the glass surface. In producing diffraction gratings by this etching method, it was found that accurate gratings could be produced at low cost by photographic methods having high resolution with only a few microns between lines.

The migration of silver into a glass matrix has been known for many years. The migration of silver ions from a material source at the glass surface has been effected by exchange of the silver ions for alkali ions such as sodium, potassium and lithium, in the lattice structure of alkali glass at elevated temperatures. Silver ions are similar in size and charge to the alkali metal ions, and above 200 to 300° C. diffuse into the glass body by changing places with the alkali ions, which in turn back-migrate into the source of silver. Electrochemical transport of silver across the interface of the glass with concurrent migration of the mobile alkali ions out of the surface area toward a cathode can also be utilized as a mechanism for migration. Metallic silver can also be transported into glass by heating a thin silver film in an oxygen atmosphere or by D-C electrical potential. These methods are treated in detail by Hall et al. in U.S. Patent No. 2,927,042 of Mar. 1, 1960.

Selection of a substrate material depends on the required rates of etching and diffusion. In general the alkali silicate glasses, such as soda lime silica glass, are preferred because of their availability with photographic emulsions. However, numerous alkali glasses are suitable, including light barium crown, potash lead silica glass, and those containing calcium oxide or alumina. Sodium is the preferred alkali cation present in the glass because of the ease with which it is replaced by silver. Also, it should be noted that the untreated glass surface may be etched at different rates depending on the glass matrix composition.

The etching step produces a surface pattern of raised and depressed glass as a result of the low resistance to chemical attack of the untreated portions of the glass surface in comparison to the high resistance of the silver-containing areas. As pointed out previously, it has been discovered that the fluoride ion does not substantially corrode or etch the matrix comprising silver, present either as silver ions or as reduced silver. The fluoride ions may be made available at the glass surface by numerous means. The ions may be present in dissolved fluoride salts or as substantially pure acid (HF). A suitable ion-forming solvent, such as water, may be applied to the glass surface by immersion of the substrate or by spraying, etc. The concentration of fluoride ion, time of contact and temperature of the etching step may be varied to produce the optimum degree of glass removal for a particular article. Dilute aqueous HF is the preferred reagent, especially when a small amount of wetting agent is added to achieve uniform etching along the glass. Various other fluoride ion sources have been used in the etching of glass; for instance, bifluorides ($NH_4HF_2$, $NaHF_2$) and fluosilicates are known as effective etchants in wide concentrations.

Referring to the drawing, wherein like numerals refer to the same elements throughout, a substrate 10 having a smooth surface and consisting essentially of lakali glass is coated with a thin layer 12 of photographic emulsion in which portions 14 of the layer contain silver in a predetermined pattern. Ordinarily the areas of silver are obtained by photomasking using contact printing or projection to selectively expose layer 12 to light. Subsequently soluble silver in the unexposed areas is removed and the latent image produced by exposure is developed. This is a well known photographic process. The substate may be a pre-coated standard glass photographic plate, as shown in FIG. 1, or the layer 12 may be "stripping film" which is exposed and developed first and transferred to the glass surface of substrate 10 for transport of the silver to the glass.

Figure 2:
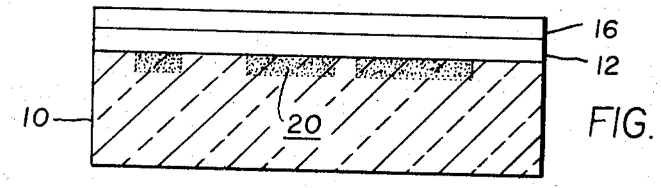

The silver material in layer 12 may be migrated into the glass surface as reduced silver or as silver ions. If the latter is preferred and a photographic process has been used to obtain the pattern, then it is necessary to oxidize the silver. This may be carried out in the same operation as the migration of silver or separately as desired. In FIG. 2 a coating 16 containing a suitable oxidizing agent for silver is sprayed or brushed over the silver-containing layer. The coated substrate is heated and the oxidation and migration of silver ions take place concurrently, resulting in formation of areas 20 of the glass surface containing silver ions. These areas have an increased refractive index which can be detected by various optical means including ultra-violet light which shows a bright pattern in the portions containing silver ions.

Figure 3:
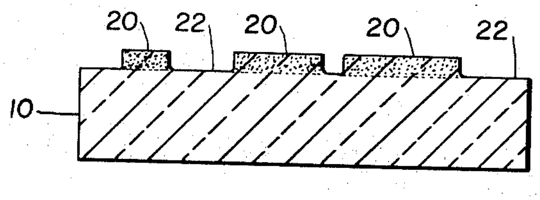

The etching step may be carried out at this point or a stain may be imparted by reducing the silver ions. The resistance of the treated glass is very high in either instance. In FIG. 3 the selective etching of untreated portions create recesses 22 in the surface of glass substrate 10. As pointed out earlier, the article may be useful at this point. For instance, a diffraction grating has been made by a photographic process having a peak-to-peak distance of 40 to 50 lines per millimeter. However, the resolution may be limited by the photographic process. Various grids, optical filters, screens, and other glass articles require precision etching. By combining the etching and staining, variegated surfaces may be produced for ornamental articles.

Figure 4:
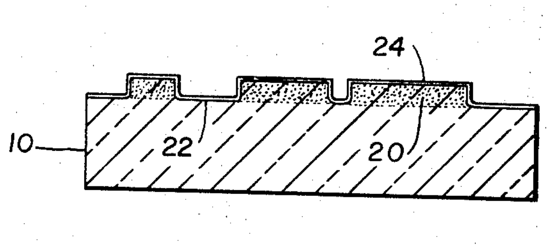
Figure 5:
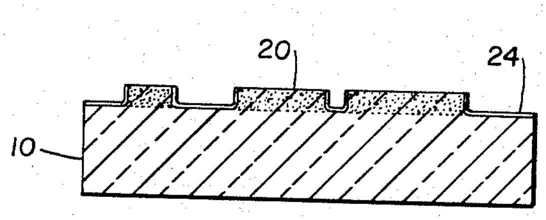

An area of immense interest utilizing dialectric substrates is the field of printed circuits. Glass urfaces are well adapted to this use in view of their excellent dimensional stability and thermal properties. By providing patterns of raised and recessed surfaces, thin films of electrical conductors, capacitors, inductive material, and semiconductors may be disposed on the glass surface. As shown in FIGS. 4 and 5, a thin film 24 of material such as aluminum may be coated on the etched substrate uniformly. Layer 24 adheres to the raised portions 20 containing silver and to etched recesses 22. The thin film 24 may be coated by several known processes, including decomposition of compounds such as metal carbonyls, vapor deposition in vacuum, cathode sputtering, etc. Ordinarily this is a very thin film of the order of several Angstroms to several microns in thickness. The pattern of the treated glass may be produced by selectively removing the thin film 24 overlying the raised portions 20 containing silver. This may be accomplished by mechanical abrasion or by etching the raised thin film 24 as by masking. Subsequently the thickness of a metal film 24 may be built up by electroplating the remaining film 24 in recesses 22. By alternately providing thin films of conductors and dielectric material, a thin capacitor may be produced.

*Example*

A Type 3 "Kodalith" Ortho plate having an alkali glass substrate and a silver-containing photosensitive coating is exposed to light to form a latent image. After developing to remove silver from unexposed areas of the coating, an oxidizing agent is applied over the developed photographic plate. This is a mixture of ferric oxide ($Fe_2O_3$), linseed oil, and turpentine which reacts with the silver in the intermediate layer. The coated substrate is heated to about 450° C. for about four hours, during which time the silver is oxidized by the ferric oxide and the silver ions are interchanged with alkali ions in the glass surface. The heating should be performed in a non-reducing atmosphere such as vacuum, air or oxygen. Other coatings may be used for oxidizing the silver. The principal advantage in the above oxidizing coating is the protection against peeling of the silver-containing layer from the glass during heating. The oxidation step may be separate from the diffusion step, if low temperature oxidation of the reduced silver is used. Glow discharge, etc., provide means for energizing the reactants in an oxidizing environment at low temperatures.

The temperature and time of the heating step for oxidation and diffusion is not critical. At 565° C. 40 minutes was satisfactory, and at 750°, two minutes was sufficient to oxidize and diffuse the silver.

Using the photographic process for depositing the silver on the substrate, a residue of the photosensitive and oxidant coatings remains on the glass surface and should be removed prior to etching. The cooled plate is washed with tap water, cleaned ultrasonically and/or cleaned in a vapor-phase organic solvent. Excess silver, carbon and inorganic residue is removed by immersing the plate in a dichromate solution of 20 ml. conc. sulfuric acid, 20 gms. sodium or potassium dichromate and 100 ml. water.

Etching of the treated alkali glass surface is by immersing the plate in dilute hydrofluoric acid at room temperature for about two to ten minutes. The fluoride reagent is 10 wt. percent HF in water with 1 ml. of alkylated aryl polyester alcohol per 1000 ml. of HF solution as a wetting agent.

If a stained article is desired, the silver may be reduced prior to etching or subsequently by heating the treated glass in a reducing atmosphere or exposing the silver to an electron beam. A suitable method for reduction is heating the plate in hydrogen for two hours at 450° C.

The amount of untreated alkali glass removed can be determined by experience with the particular substrate composition, and degree of silver penetration into the matrix. The concentration of available silver at the glass surface may influence the matrix concentration, and it is known that certain anions substantially affect the diffusion of ionic silver. Silver chloride is an especially valuable source of silver for migration. Excessive etching of the untreated glass may result in removal of undiffused glass under the silver-containing portions. The shape of the etched recesses are determined by the silver concentration and degree of penetration. It should be noted that the areas to be etched may contain a small amount of silver without departing from the inventive concept, if the resistance to etching is substantially less than the treated areas.

Any pattern or scale which can be produced on a photographic plate can be accurately transferred to a glass surface by diffusion and selectively etched to the resolution of the photographic image. While the invention has been present by specific embodiment, the invention concept is not intended to be limited except by the following claims.

I claim:

1. A method for selectively etching an alkali glass surface comprising:

(a) selectively exposing a silver photosensitive layer to form a latent image, (b) developing the latent image by removing soluble silver from the layer while leaving silver in exposed areas,
(c) oxidizing the remaining silver to form silver ions in the layer,
(d) heating the silver to exchange silver ions in the coating with alkali ions in an adjacent alkali glass surface, and
(e) contacting the glass surface with fluoride ions to selectively etch portions of the glass surface containing no silver.

2. The method of claim 1 wherein oxidizing step (c) comprises coating the layer with ferric material and heating the coated layer to oxidize the silver with ferric ions.

3. The method of claim 2 wherein the ferric coating contains iron oxide, linseed oil and turpentile, and the heating temperature is about 450° C.

4. The method of claim 1 wherein selective etching step (e) comprises contacting the glass surface with dilute aqueous hydrofluoric acid solution.

5. The method of claim 4 wherein the acid solution is about 10 wt. percent HF containing a wetting agent and the glass surface is immersed for about ten minutes.

6. The method of claim 1 which comprises the additional steps of coating the selectively-etched glass surface with a thin metal film adhering to the selectively-etched surface, and removing portions of the thin film coated over raised portions of the substrate.

7. The method of claim 6 wherein the thin film is electrically conducting and is removed from raised portions of the substrate by abrasion.

8. The method of claim 1 including the step of reducing silver ions subsequent to heating step (d) and prior to etching step (f).

9. The method of claim 8 wherein the reducing step comprises heating the substrate in a hydrogen atmosphere.

10. A method for selectively etching an alkali glass surface comprising (a) migrating silver into selected surface portions of an alkali glass substrate to a sufficient degree so that said selected surface portions exhibit a substantially higher resistance to fluoride ions than the other surface portions of said glass substrate and
(b) contacting the glass surface with fluoride ions to selectively etch said other surface portions of the glass surface.

11. The method of claim 10 wherein the etching step (c) includes immersion of the glass substrate in aqueous hydrofluoric acid solution for a period of time sufficient to remove substantial amounts of said other portions of the glass substrate.

12. The method of claim 10 including the steps of coating the selectively etched glass surface with a uniformly thin film and selectively removing the thin film portions overlying said selected surface portions of the substrate.

13. The method of claim 12 wherein the thin film is electrically conducting.

References Cited

UNITED STATES PATENTS

| | | | |
|---|---|---|---|
| 2,904,432 | 9/1959 | Ross et al. | 96—34 |
| 2,118,386 | 5/1938 | Swinehart | 156—24 XR |
| 2,927,042 | 3/1960 | Hall et al. | 117—38 |
| 2,988,839 | 6/1961 | Greenman et al. | |
| 2,989,384 | 6/1961 | Allen et al. | 156—15 |

OTHER REFERENCES

Modern Techniques of Producing Precision Scales and Reticles, by R. D. Geiser, 1953, Photographic Engineering, vol. 4, No. 1, p. 10.

Coloured Glass, by W. A. Weyl, pub. by Soc. of Glass Technology, Sheffield, Great Britain, cpw. 1951, pp. 409 to 419.

JACOB M. STEINBERG, *Primary Examiner.*